Oct. 6, 1959 R. G. PETER 2,907,551
ROLLER BIT
Filed Jan. 13, 1955 4 Sheets-Sheet 1
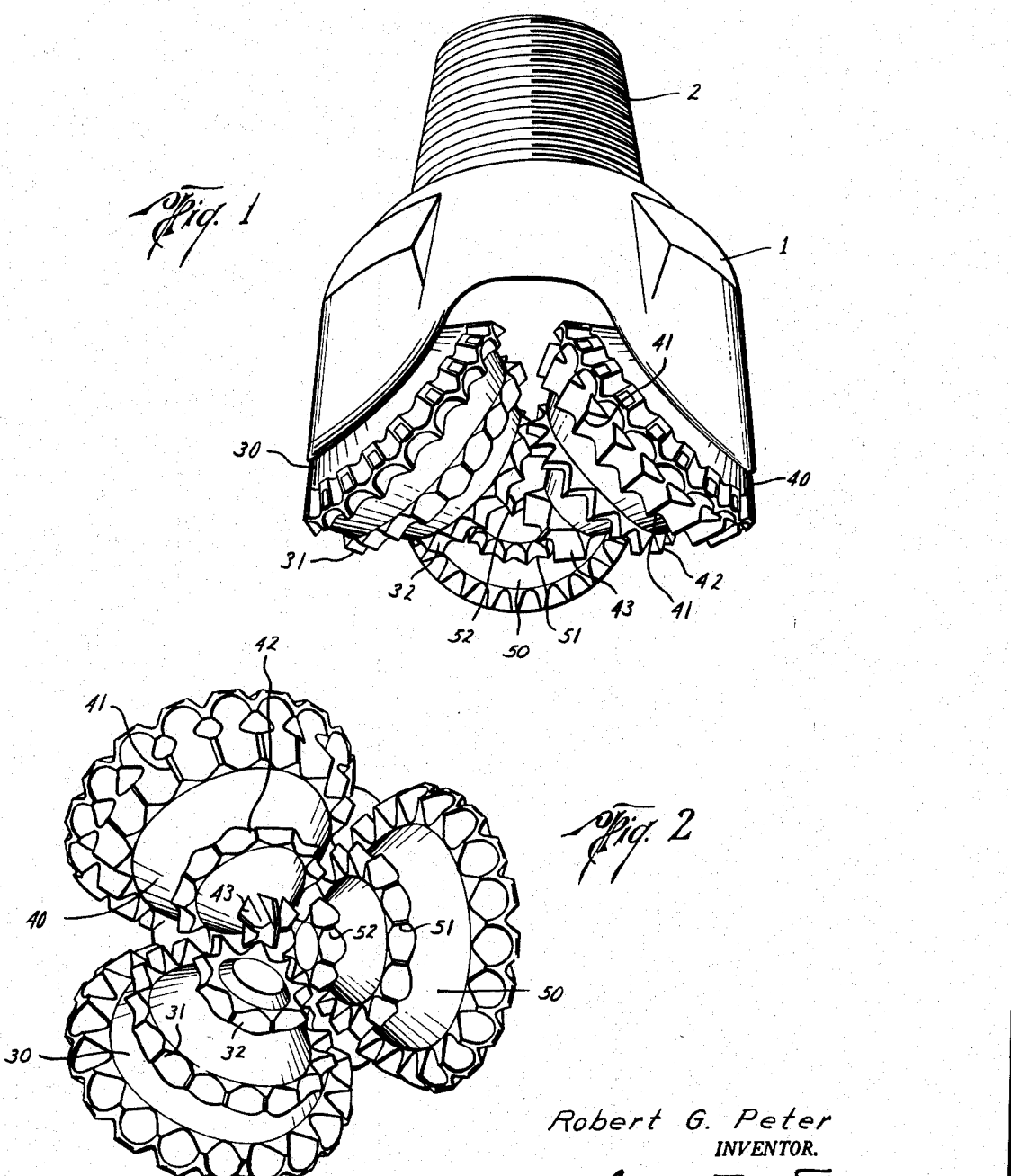
Robert G. Peter
INVENTOR.
BY J. Vincent Martin
Joe E. Edwards
B. R. Pravel
ATTORNEYS

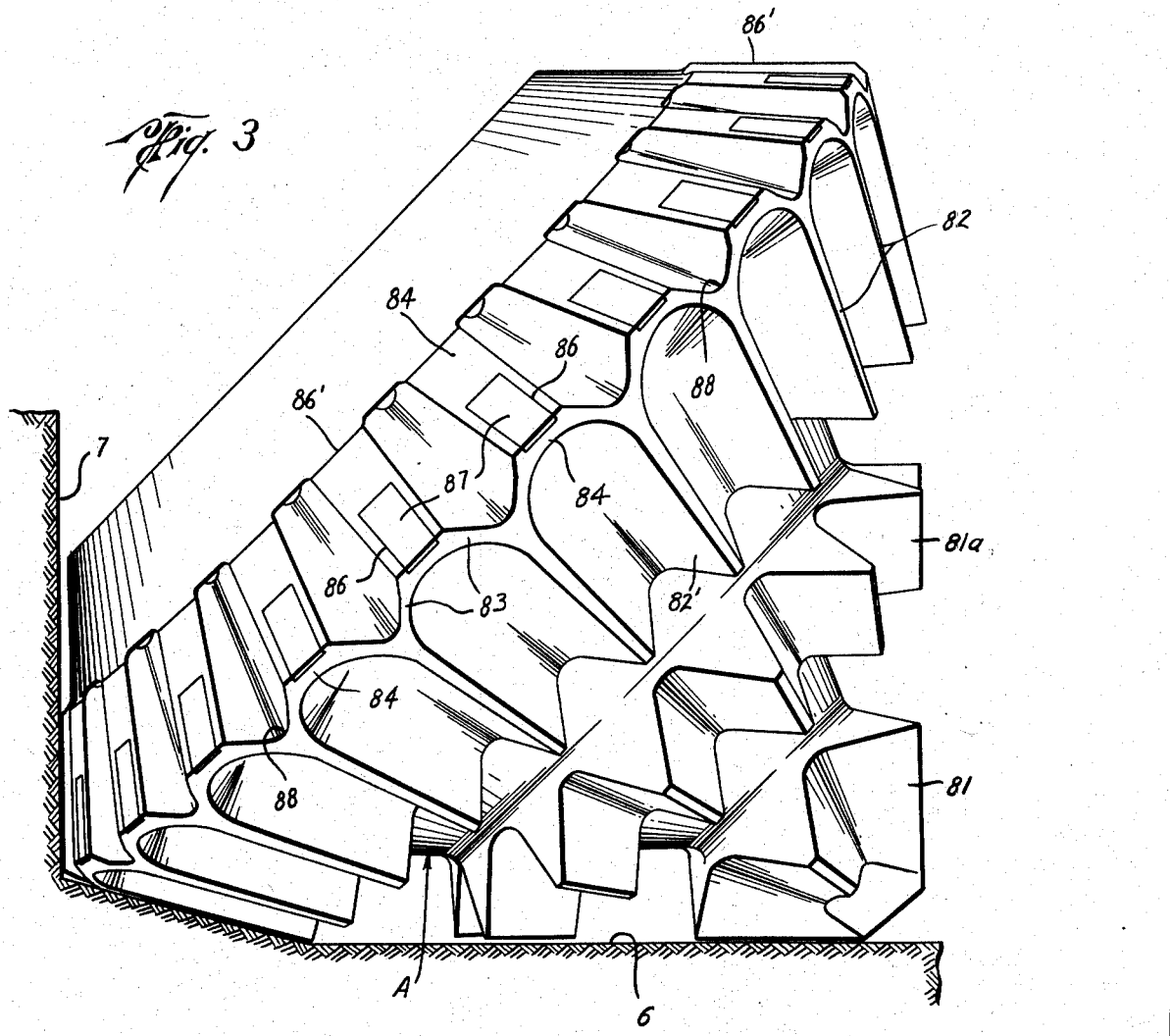

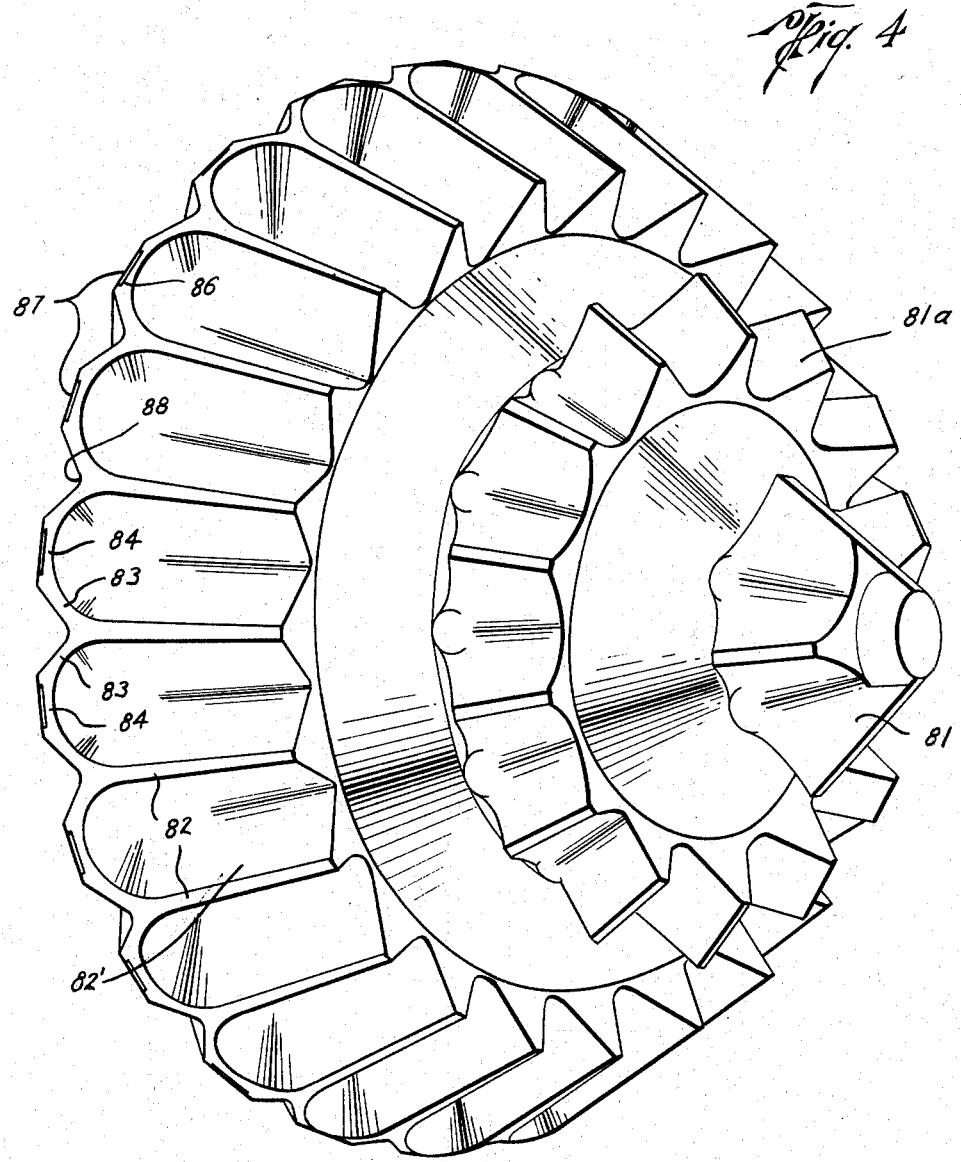

Oct. 6, 1959 R. G. PETER 2,907,551
ROLLER BIT

Filed Jan. 13, 1955 4 Sheets-Sheet 4

Robert G. Peter
INVENTOR.

BY
ATTORNEYS

United States Patent Office 2,907,551
Patented Oct. 6, 1959

2,907,551
ROLLER BIT

Robert G. Peter, Houston, Tex., assignor to Reed Roller Bit Company, Houston, Tex., a corporation of Texas Application January 13, 1955, Serial No. 481,629

6 Claims. (Cl. 255—349)

This invention relates to roller bits.

It has for its general object to provide a roller bit having new and improved roller cutters to drill more efficiently earth formations.

The drilling of a deep well is accomplished by a roller bit mounted on the lower end of a drill stem. When the drill stem is rotated, the bit penetrates the formation. When a bit becomes worn, the drill stem is removed from the hole, the worn bit is removed from the drill stem, and a new bit is mounted thereon, whereupon the stem, with the new bit on the lower end thereof, is lowered into the bore hole so that drilling may proceed. It is important that the bit function to drill a hole of a uniform diameter because if the diameter of the hole decreases as the bit becomes worn, it may become necessary to ream the hole to a uniform diameter before a new bit can reach the bottom of the hole which has been produced by the worn, or undersized, bit. In other words, it is important to drill and maintain the gage of the hole so that new bits (or other equipment) may be lowered to the bottom of the hole.

This invention has for one of its specific objects the provision of a new and improved roller cutter having a tooth arrangement which will efficiently drill and maintain the gage of a bore hole.

Other objects will hereinafter appear.

The preferred embodiment of this invention is illustrated by the accompanying drawings in which:

Fig. 1 is an isometric view of a cone-type bit.

Fig. 2 is a bottom plan view of the bit shown by Fig. 1.

Fig. 3 is a an enlarged side elevation view of a cone-type cutter in operating position against the formation at the bottom of a hole.

Fig. 4 is another view of the cone-type cutter shown by Fig. 3.

Figure 5:
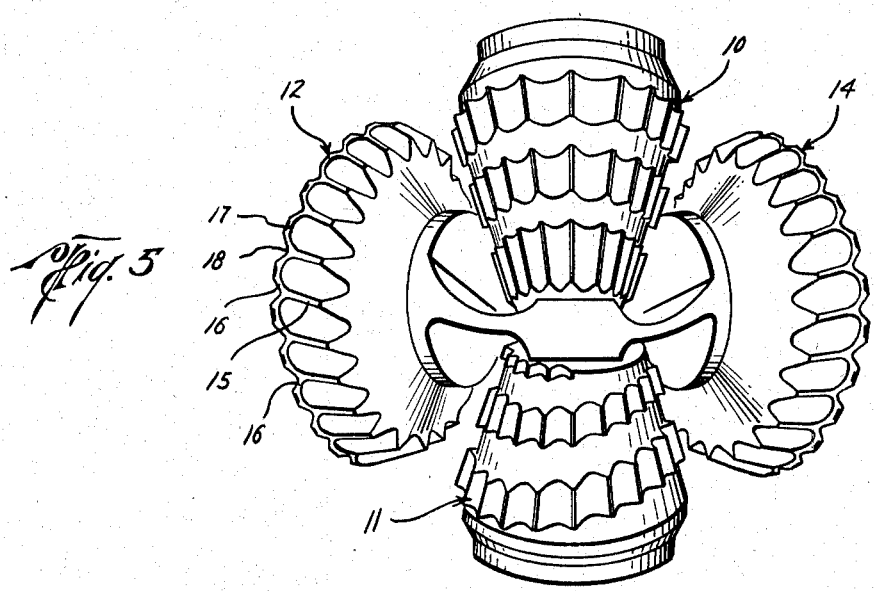
Fig. 5 is a bottom plan view of a cross roller type bit embodying the invention.

Referring to Figs. 1 and 2, the numeral 1 indicates a conventional bit head having a threaded shank 2 by which it may be connected to the lower end of a drill stem (not shown). In this head are rotatably mounted, in the usual manner, three cone-type roller cutters 30, 40 and 50, with their base ends outermost.

The cone cutter 30 is provided with inner rows of cutting teeth 31 and 32; the cutter 40 with inner rows of cutting teeth 41, 42 and 43; and the cutter 50 with inner rows of cutting teeth 51 and 52. These teeth cut the inner portion of the bottom of a bore hole.

The cutters 30, 40 and 50 have circumferentially disposed teeth on their outer body portions.

Referring more particularly to the enlarged views of Figures 3 and 4, it is to be noted that the cutter comprises a frusto-conical gage surface portion 86' and a substantially conical body portion A. The bottom of the bore hole is indicated at 6 and the side wall, or gage, of the hole is indicated at 7. The cone-type cutter shown in Figures 3 and 4 is similar to the cone-type cutters shown in Figures 1 and 2. The inner rows of teeth are indicated at 81 and 81a. The frusto-conical gage surface portion 86' has thereon a plurality of spaced gage teeth 84, spaced by grooves 88, in said gage surface 86'.

The conical body portion A is provided with circumferentially disposed teeth 82 formed by grooves 82'. At the outer extremity of each tooth 82 there are provided wall portions designated as 83. These wall portions 83 merge with adjacent gage teeeth 84 on said gage surface 86'. More specifically it is to be noted that the wall portions 83 merge with the adjacent ends of each of the gage teeth 84.

The wall portion 83, or common wall, is formed between the adjacent grooves 82' and 88. In other words, the body portion grooves 82' and the gage surface grooves 88 leave a portion of the said body portion to form the wall portion 83.

If desired the gage tooth 84 may be recessed as indicated at 86 to accommodate hard metal 87 which may be deposited in the recess 86 by welding or in any other suitable manner known in the art.

Thus, the gage teeth 84 are strongly supported by the walls 83 so that, in operation, the flexing of the gage teeth 84 is reduced and the loss of the brittle hard metal 87 is thereby alleviated. Further, the grooves 88 provide channels into which cuttings may move out of the space between the cutter and the side wall of the hole, to be carried out of the hole by the drilling fluid. In practice it has been determined that this tooth arrangement provides satisfactory cutter traction and cutting effect on the wall or gage of the bore hole.

The cross roller bit shown by Fig. 5 includes side roller cutters 12 and 14 and cross roller cutters 10 and 11. The side roller cutters also embody the present invention. The gage teeth are shown at 17, the walls are shown at 16 and the circumferentially disposed teeth are shown at 15, with the gage surface groove 18 in alignment with the teeth 15.

This invention is not limited to the preferred embodiment herein disclosed. Various changes may be made within the scope of the following claims.

I claim:

1. A roller cutter having a body portion and a gage surface, spaced teeth on the gage surface, radially extending grooves in said surface to space said teeth, circumferentially disposed teeth formed by radially extending grooves in said body portion, the grooves in said body portion being offset from and adjacent to the grooves on the gage surface whereby a common wall is formed between a groove in the gage surface and an adjacent groove in the body portion, said wall forming an extension of the respective teeth on the gage surface and on the body portion.

2. A roller cutter as set forth in claim 1 wherein the grooves in said gage surface are axially aligned with the said circumferentially disposed teeth.

3. A roller cutter as set forth in claim 1 wherein the body portion is substantially conical, and the gage surface is frusto-conical, and the circumferentially disposed teeth extend longitudinally along the cone surface of said body portion.

4. A roller cutter as set forth in claim 3 wherein the outer surfaces of said spaced gage teeth have hard metal therein.

5. A roller cutter having a body portion and a gage surface, circumferentially spaced teeth on the gage surface, circumferentially disposed longitudinally extending teeth on said body portion offset with respect to the teeth on the gage surface, each tooth on the body portion having diverging portions at its outermost end merging with the ends of adjacent gage surface teeth.

6. A cone bit having a head and a plurality of substantially conical roller cutters mounted rotatably in said head, at least one of the said cutters having a body portion and a gage surface, circumferentially spaced teeth on the gage surface, circumferentially disposed longitudinally extending teeth on said body portion offset with respect to the teeth on the gage surface, each tooth on the body portion having diverging portions at its outermost end merging with the ends of adjacent gage surface teeth.

References Cited in the file of this patent

UNITED STATES PATENTS

| | | |
|---|---|---|
| 1,322,696 | Hughes | Nov. 25, 1919 |
| 2,104,822 | Scott | Jan. 11, 1938 |
| 2,527,838 | Morlan et al. | Oct. 31, 1950 |
| 2,533,257 | Woods et al. | Dec. 12, 1950 |